United States Patent
Ruggiano

(10) Patent No.: US 8,521,402 B2
(45) Date of Patent: Aug. 27, 2013

(54) METHOD FOR CONTROLLING THE AIR SUPPLY IN A CYLINDER OF A FOUR-STROKE INTERNAL COMBUSTION ENGINE WITH CONTROLLED IGNITION

(75) Inventor: Renzo Ruggiano, Bologna (IT)

(73) Assignee: Magneti Marelli S.p.A. (IT)

( * ) Notice: Subject to any disclaimer, the term of this patent is extended or adjusted under 35 U.S.C. 154(b) by 193 days.

(21) Appl. No.: 13/182,593

(22) Filed: Jul. 14, 2011

(65) Prior Publication Data
US 2012/0089318 A1 Apr. 12, 2012

(30) Foreign Application Priority Data
Jul. 14, 2010 (IT) .............................. B02010A0447

(51) Int. Cl.
*F02D 28/00* (2006.01)
(52) U.S. Cl.
USPC ......................................... 701/104; 701/103
(58) Field of Classification Search
USPC ............... 701/101–106, 110, 115; 123/27 R, 123/299, 300, 316, 347, 348, 403, 478, 480; 73/114.32, 114.33
See application file for complete search history.

(56) References Cited

U.S. PATENT DOCUMENTS

| 2004/0139949 A1 | 7/2004 | Koseki et al. |
| 2005/0021220 A1* | 1/2005 | Nakamura et al. ............ 701/115 |
| 2008/0229817 A1* | 9/2008 | Hartmann et al. ......... 73/114.79 |
| 2008/0319600 A1 | 12/2008 | McLain et al. |
| 2011/0023842 A1* | 2/2011 | Kurtz ........................ 123/568.12 |
| 2011/0048375 A1* | 3/2011 | Wegener et al. ............... 123/444 |
| 2011/0100013 A1* | 5/2011 | Whitney et al. .................. 60/706 |

FOREIGN PATENT DOCUMENTS

| EP | 1 813 795 A1 | 1/2007 |
| JP | 1-285640 A | 11/1989 |

OTHER PUBLICATIONS

Feb. 7, 2011 Search Report for Italian Patent App. No. B02010A 000446.
Feb. 10, 2011 Search Report for Italian Patent App. No. B02010A 000447.

* cited by examiner

*Primary Examiner* — John T. Kwon
*Assistant Examiner* — Johnny Hoang
(74) *Attorney, Agent, or Firm* — Howard & Howard Attorneys PLLC

(57) ABSTRACT

A method for controlling air supply in a cylinder of a four-stroke internal-combustion engine with controlled ignition includes steps of: determining, in a phase prior to a suction phase, an estimate of mass of desired air to be sucked into the cylinder during the suction phase; determining, in a phase prior to the suction phase, a forecast of suction pressure during the suction phase; determining, in a phase prior to the suction phase, programming of suction of air as a function of the estimate of the mass of the desired air to be sucked into the cylinder during the suction phase and of the forecast of the suction pressure during the suction phase; and controlling, until an end of an exhaust phase, the suction of air into the cylinder by piloting a control device for implementation of an intake valve according to the programming of the suction of air.

6 Claims, 8 Drawing Sheets

Fig. 3 – State of the art

METHOD FOR CONTROLLING THE AIR SUPPLY IN A CYLINDER OF A FOUR-STROKE INTERNAL COMBUSTION ENGINE WITH CONTROLLED IGNITION

TECHNICAL FIELD

The present invention relates to a method for controlling the air supply in a cylinder of a four-stroke internal combustion engine with controlled ignition.

PRIOR ART

An internal combustion engine comprises at least one cylinder, inside of which slides a piston with alternative motion which is mechanically connected to a crankshaft. The cylinder is connected to an intake manifold by way of at least one intake valve and is connected to an exhaust manifold by way of at least one exhaust valve. In the case of indirect injection the fuel is injected by an injector arranged upstream of the intake valve, but in the case of direct injection the fuel is injected by an injector arranged in the dome of the cylinder.

In a four-stroke internal combustion engine a cycle of each cylinder is composed of four subsequent phases: suction, compression, expansion and exhaust; the fuel burns in the expansion phase and therefore must be injected at the latest during the suction phase (in the case of indirect injection) or during the compression phase (in the case of direct injection). In order to achieve fuel injection it is necessary to pre-program the fuel injection itself, i.e. it is necessary to determine the opening engine angle of the injector (i.e. start of the injection) and the closing engine angle of the injector (i.e. end of the injection).

In an internal combustion engine with controlled ignition an optimal air/fuel ratio is in turn established (usually close to the stoichiometric ratio) and to ensure high efficiency and reduced generation of pollutants it is necessary that the combustion in the cylinders takes place respecting as much as possible the optimal air/fuel ratio (to comply with current regulations on emissions the error on the air/fuel ratio must not be greater, in transition, than 5%); therefore, the mass of fuel that is injected at each cycle and in each cylinder is calculated from time to time depending on the optimal air/fuel ratio and on the mass of air that is sucked into the cylinder itself. The mass of air that is sucked into the cylinder depends on the geometric characteristics of the internal combustion engine (which are fixed and can be experimentally learned during the design step) and on the suction pressure (i.e. the pressure in the intake manifold) during the suction phase. The instantaneous suction pressure is measured by a pressure sensor coupled to the intake manifold, which typically provides (publishes) a measurement update of the suction pressure at the end of each phase of the cycle.

In a known internal combustion engine with controlled ignition, in each cylinder and for each cycle, the fuel injection is usually scheduled at the end of the previous expansion phase (i.e. at the start of the previous discharge), i.e. at the end of the previous expansion phase is decided both the opening engine angle of the injector and the closing engine angle of the injector (in some applications, the fuel injection is performed a first time at the beginning of the compression stage and successively typically changed until the beginning of the exhaust phase, which therefore represents the last useful programming).

The closing engine angle of the injector is decided in an attempt to minimize the generation of pollutants (i.e. at same mass of fuel to inject by varying the closing engine angle of the injector it is possible accordingly to vary the amount of pollutants that are generated during combustion); the opening engine angle of the injector is determined starting from the closing engine angle of the injector as a function of the mass of fuel to be injected, i.e. the opening engine angle of the injector must be within the closing engine angle of the injector of an angular distance that can be covered in the time required to inject exactly the mass of fuel to be injected. As mentioned previously, the mass of fuel to be injected is determined as a function of the optimal air/fuel ratio and of the mass of air that will be sucked into the cylinder during the suction phase; to estimate the mass of air that will be sucked into the cylinder during the suction phase it is necessary to forecast the suction pressure during the suction phase, and the forecast of the suction pressure during the suction phase is provided by a forecast algorithm of the suction pressure that attempts to extrapolate the future performance of the suction pressure using the measurements of the suction pressure available at the end of the expansion phase.

That described above is schematically illustrated in the graph in FIG. 3, in which is shown that at an engine angle $A_P$ placed at the end of an expansion phase is scheduled the following fuel injection by establishing the next opening engine angle $A_O$ of the injector and closing engine angle of the injector $A_C$.

This control mode has the disadvantage of requiring a very sophisticated forecast algorithm of the suction pressure that is able to accurately forecast the evolution of the suction pressure for the next full rotation of the crankshaft (in a four-stroke engine two consecutive phases cover a 360° engine angle equal to a full turn). Therefore, the forecast algorithm of suction pressure is of a difficult calibration because of its complexity, requiring a relatively high computing power and occupies a significant amount of memory. Moreover, in certain particular engine points (typically in a strong transition) the forecast algorithm of the suction pressure can make significant mistakes determining an actual air/fuel ratio distant from the optimal air/fuel ratio with a subsequent negative impact on combustion efficiency, on the generation of pollutants and also on the regularity of the generation of the driving torque (which should be as free as possible from "holes" or impulse "peaks" for avoiding the generation of unwanted vibrations).

Finally, in a system of this type it is not possible to make fuel injections that close before the starting of the exhaust phase, in the case such implementation should prove to be optimal for the abatement of emission of pollutants, as it would not be possible a programming of the injection consistently with the forecast information of pressure of the intake manifold which is not yet available.

When there is a device for monitoring the implementation of the valves, it is necessary to program in advance not only the fuel injection, but it is also necessary to program in advance the opening of the intake valves, i.e. for each cylinder, it must be established in advance, for example, the engine angle for which the intake valves remain open. The programming of the intake valve control requires knowledge of the suction pressure (i.e. the pressure in the intake manifold) with a timing advance depending on the type of the actuator and the operating conditions and in many cases strongly greater than the timing advance needed for the programming of fuel injection; consequently, the forecast algorithm of the suction pressure must be even more complex in order to forecast the suction pressure well in advance (at the end of the previous compression phase or even at the end of the previous suction phase). In other words, in an internal combustion engine provided with a control system for the implementation of the valves, the forecast algorithm of the suction pressure must be very complex to be able to accurately forecast the evolution of the suction pressure for subsequent rotation and a half of the crankshaft (i.e. an engine angle of 540°) or even for the successive two full rotations of the crankshaft (i.e. an engine angle of 720°).

The need for a very early command programming of the intake valves determines that the current control systems for the implementation of the valves, that fulfill only one programming implementation, in the case of forecast error trap in the cylinders a mass of air different from that desired, with unwanted side effects on both the generation of torque (and hence on the driving), and in the formation of pollutants. Even in the case of a correct forecast, it will however be generated a torque corresponding to a target, far however from the request of the driver pending at the time of the implementation (starting of suction) translating therefore into a loss of system readiness.

DESCRIPTION OF THE INVENTION

The aim of the present invention is to provide a method for controlling the air supply in a cylinder of a four-stroke internal combustion engine with controlled ignition, said control method being devoid of the drawbacks described above and, in particular, being of simple and inexpensive implementation.

According to the present invention a method is provided for controlling the air supply in a cylinder of a four-stroke internal combustion engine with controlled ignition as claimed by the appended claims.

BRIEF DESCRIPTION OF DRAWINGS

The present invention will now be described with reference to the annexed drawings, which illustrate a non limitative example of embodiment, in which.

PREFERRED EMBODIMENTS OF THE INVENTION

Figure 1:
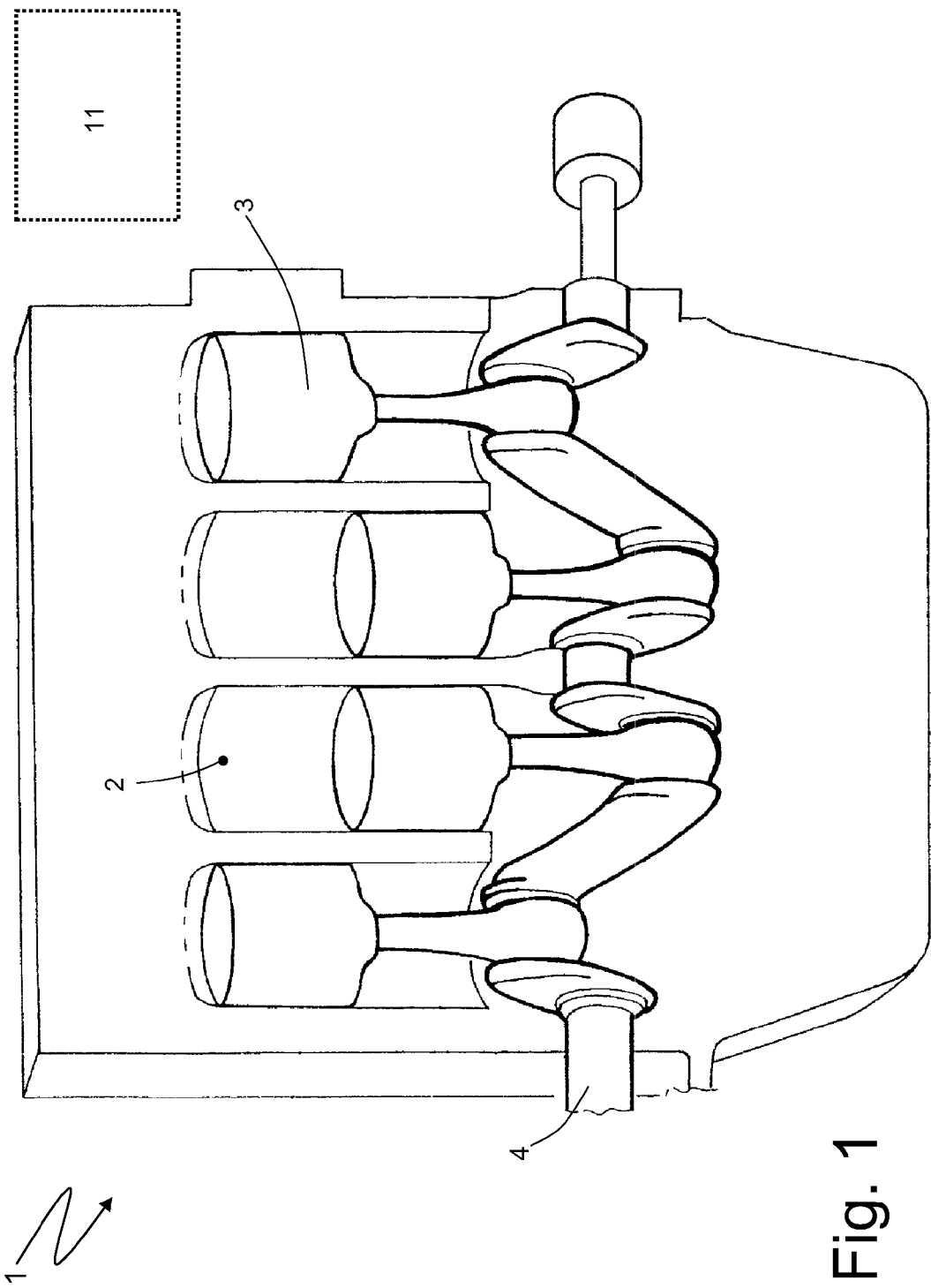
FIG. 1 is a schematic view of an internal combustion engine provided with a control unit that implements the control method object of the present invention.

In FIG. 1, with the number 1 is indicated as a whole an internal combustion engine comprising four cylinders 2 arranged in line. Each cylinder 2 houses a respective piston 3 mechanically connected by way of a connecting rod to a crankshaft 4 to transmit to the crankshaft 4 itself the force generated by the combustion inside the cylinder 2.

Figure 2:
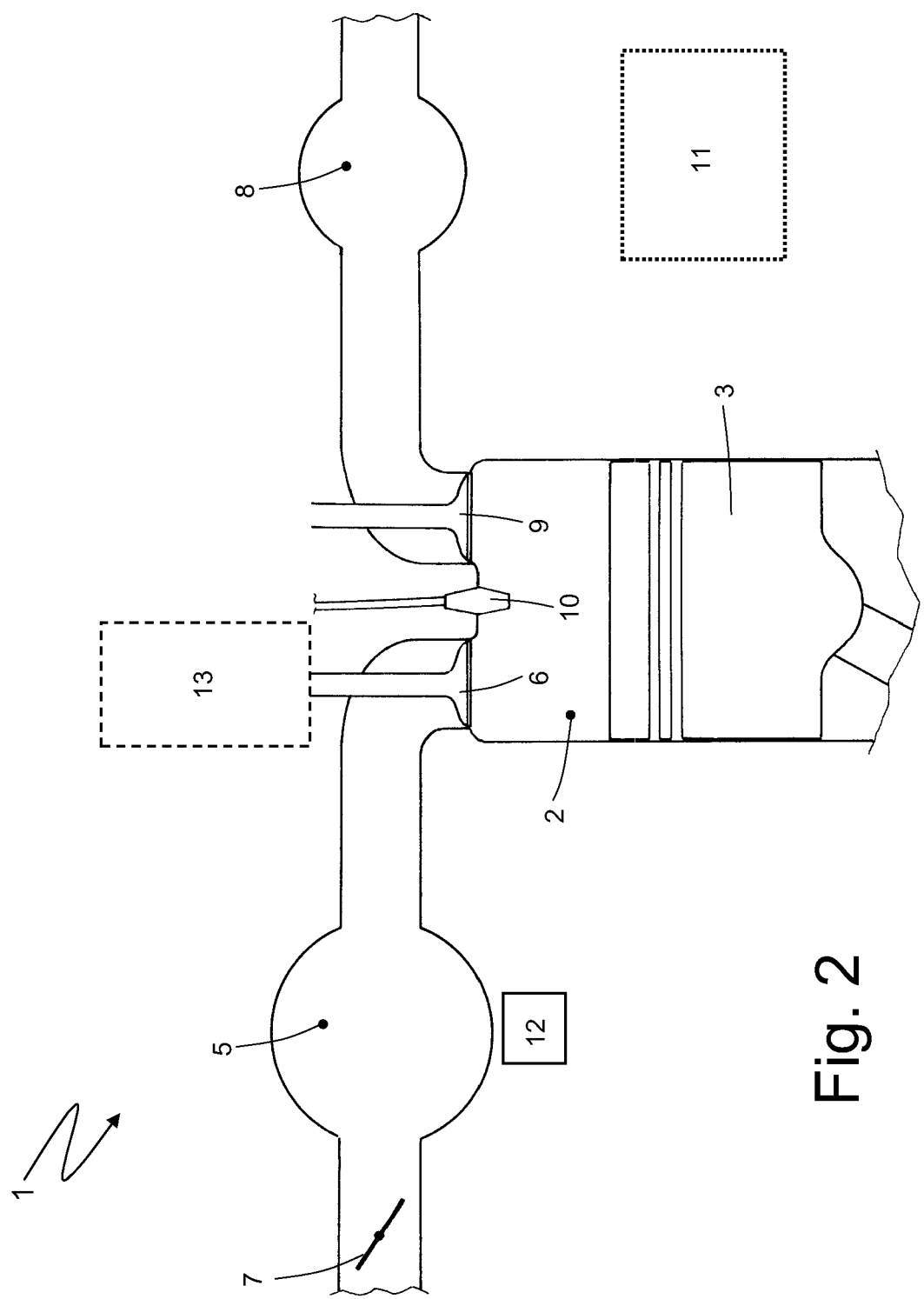
FIG. 2 is a schematic view of a cylinder of the internal combustion engine of FIG. 1.
Figure 3:
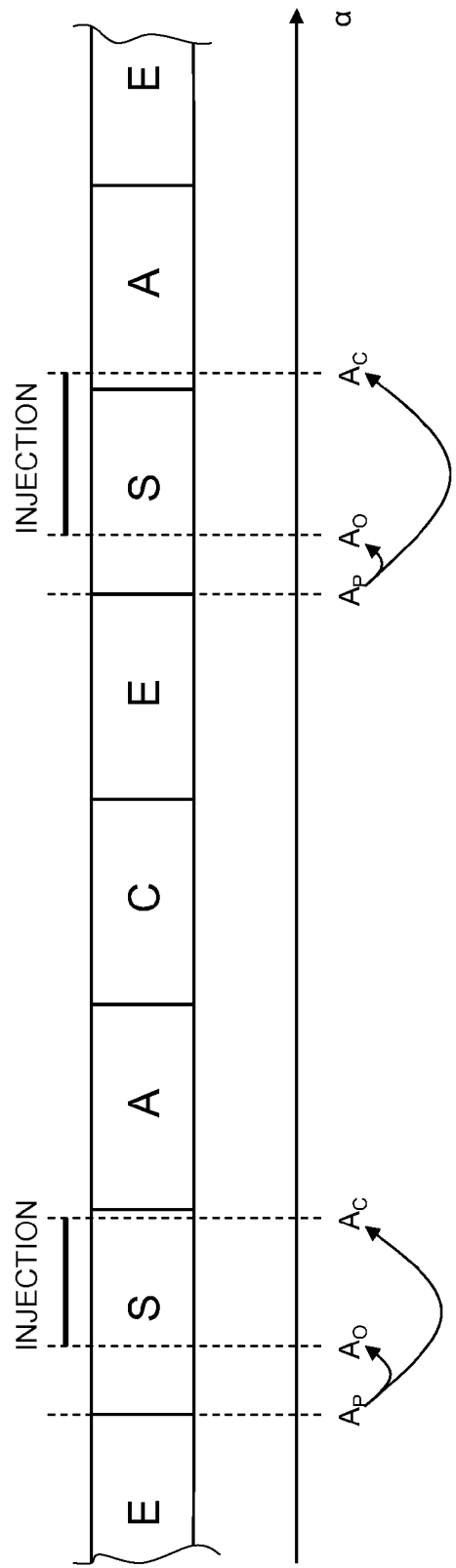
FIG. 3 is a graph illustrating the programming and execution of fuel injection during the four phases of a cylinder of the internal combustion engine of FIG. 1 according to a known control method and belonging to the state of the art.

As shown in FIG. 2, the internal combustion engine 1 comprises an intake manifold 5 which is connected to each cylinder 2 by means of two intake valves 6 (only one of which is shown in FIG. 2) and receives fresh air (i.e. air coming from the outside) which constitutes the combustive air through a throttle valve 7 movable between a closed position and a fully open position. In addition, the internal combustion engine 1 comprises an exhaust manifold 8 which is connected to each cylinder 2 by way of two exhaust valves 9 (only one of which is shown in FIG. 2) which flows in a exhaust conduit (not shown) to emit the gases produced by combustion into the atmosphere.

The internal combustion engine 1 shown in FIG. 2 is of direct injection, then for each cylinder 2 is provided an injector 10, which injects fuel directly into the cylinder 2. According to a different embodiment not shown, the internal combustion engine 1 is of indirect injection, then for each cylinder 2 the corresponding injector 10 is arranged upstream of the cylinder in an intake conduit which connects the intake manifold 5 to the cylinder 2.

Finally, the internal combustion engine 1 comprises a control unit 11 which supervises the operation of the combustion engine 1 and, among other things, pilots the injector 10 of each cylinder 2 to control the fuel injection. The control unit 11 is connected to a pressure sensor 12, which is coupled to the intake manifold 5 and measures the suction pressure, i.e. the air pressure inside the intake manifold 5; typically, the pressure sensor 12 provides to the control unit 11 an update measurement $P_M$ of the intake pressure at the end of each phase of the cycle of a cylinder 2.

The following describes the mode used by the control unit 11 to control the fuel injection of a single cylinder 2.

Initially, the unit 11 determines a desired air/fuel ratio $\lambda_{DES}$; as a function of the motor point. The purpose of controlling the fuel injection is to provoke the combustion within the cylinder 2 with an actual air/fuel ratio $\lambda$ as close as possible to the desired air/fuel ratio $\lambda_{DES}$; the mass $M_{AIR}$ of air that is sucked into the cylinder 2 at each suction phase has a less precise and generally slower adjustment with respect to the mass $M_{FUEL}$ of fuel that is injected into the cylinder 2, therefore, normally it is the mass $M_{FUEL}$ of fuel injected into the cylinder 2 that must adapt to the mass $M_{AIR}$ of air that is sucked into the cylinder 2 and not vice versa.

In the case of indirect injection (other than that shown in FIG. 2), the fuel must be injected before the end of the suction phase, as when the intake valve 6 of the cylinder 2 closes the fuel injected upstream of the intake valve 6 can no longer enter the cylinder 2; in particular, the injection of fuel should be completed slightly before the end of the suction phase, i.e. the closing of the intake valve 6, as well as the last fuel injected must have time for entering the cylinder 2 by flowing the distance between the injection nozzle of the injector 10 and the intake valves 6.

Assuming to limit the degree of freedom represented by the choice of the injection phase and to carry out the injection also during the suction phase (i.e. either completely in the suction phase, or in part during the discharge phase and in part during the suction phase), there is the possibility to be able to make a correction of the programming of the injection at the beginning of the suction phase.

Figure 4:
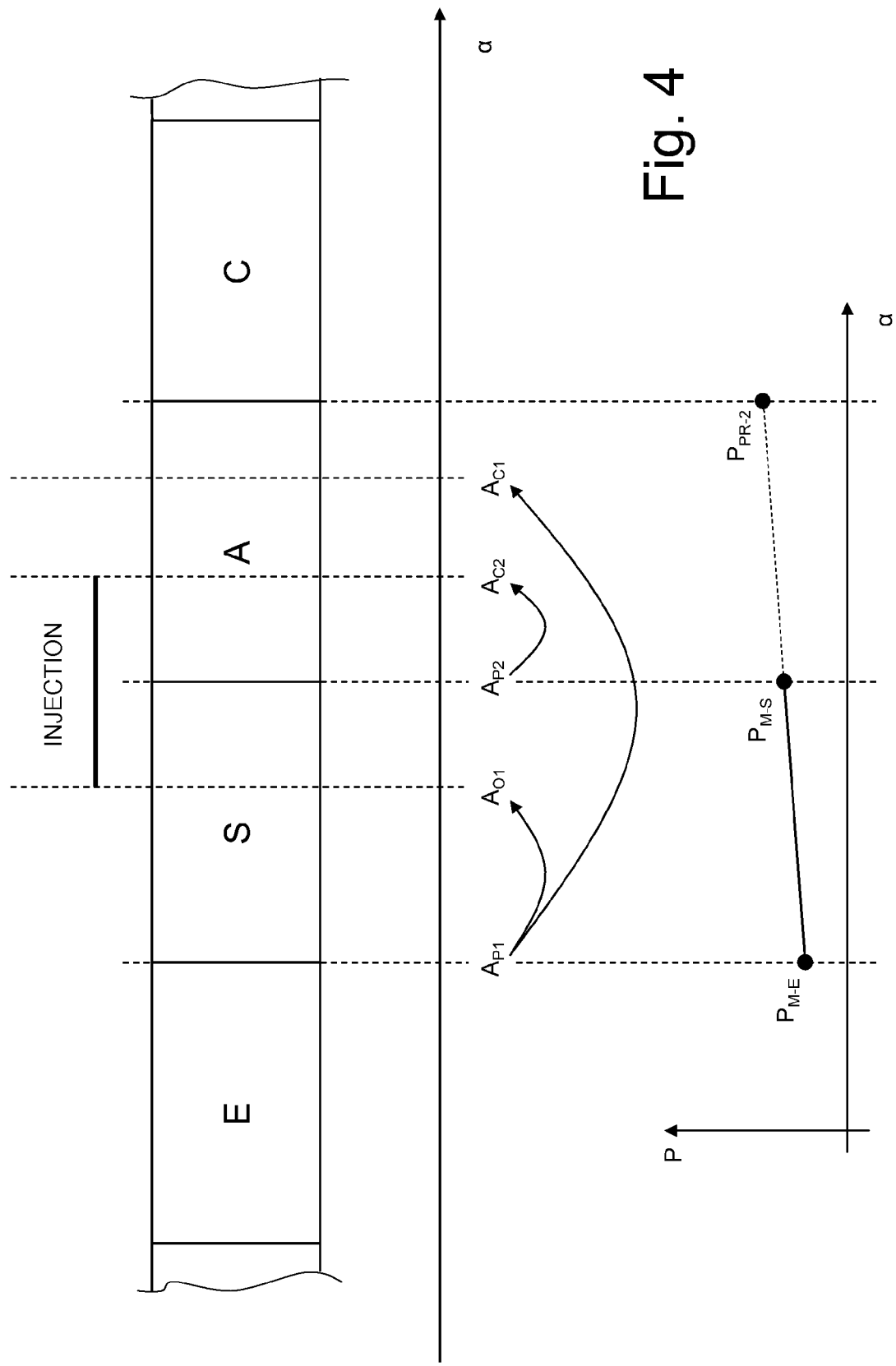
FIGS. 4-7 are graphs illustrating the programming and execution of fuel injection during the four phases of a cylinder of internal combustion engine of FIG. 1 according to four alternative embodiments of the control of fuel injection object of the present invention.
Figure 5:
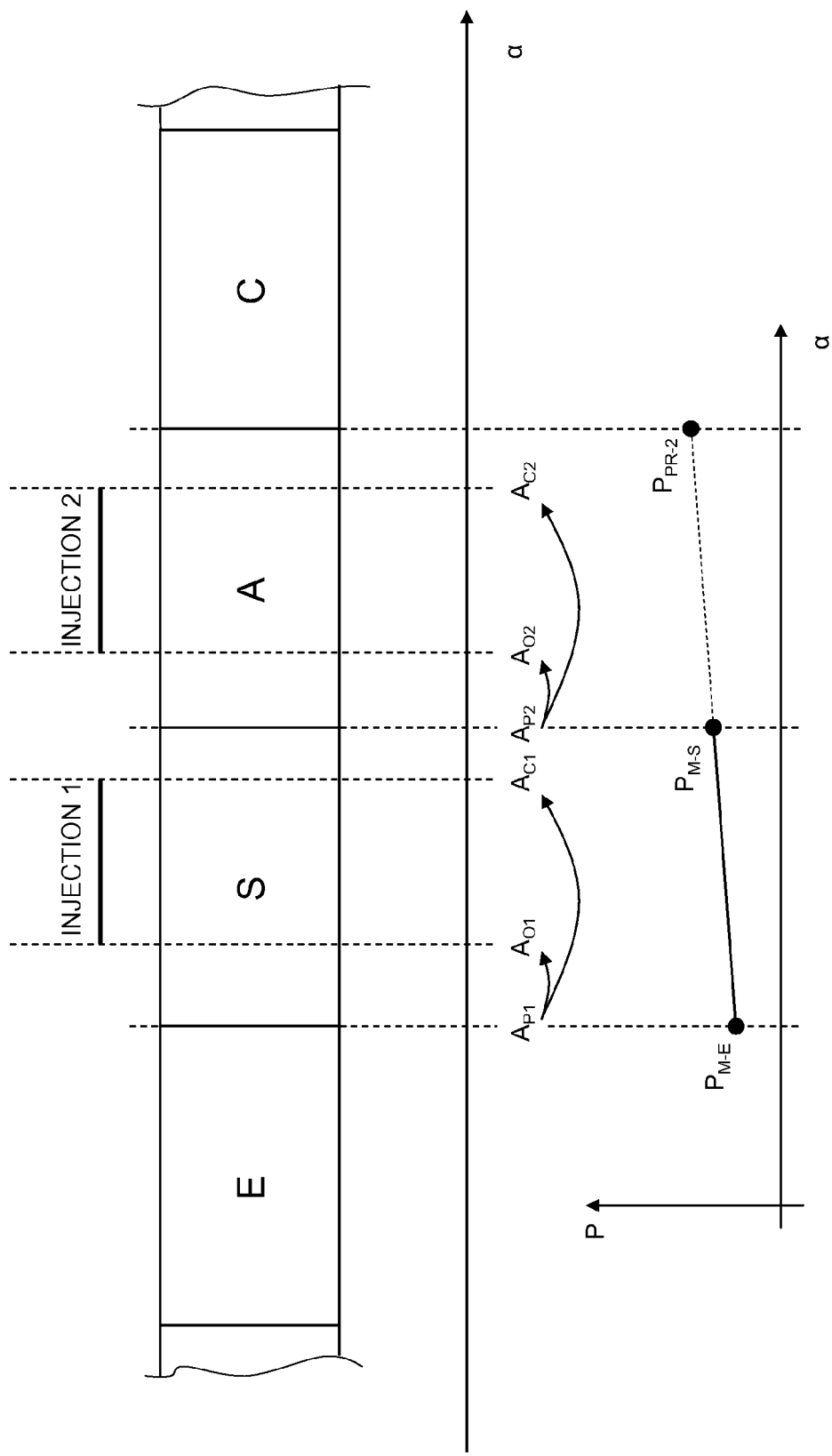

As shown in FIGS. 4 and 5, at an engine angle $A_{P1}$ arranged before the exhaust phase (and preferably at the end of the expansion phase, i.e. at the start of the exhaust phase) the control unit 11 determines a first forecast $P_{PR-1}$ of the suction pressure during the suction phase by a first forecast algorithm that uses the previous measurements $P_M$ of the intake pressure (which are provided by the pressure sensor 12 to the control units 11 at the end of each phase of the cycle of the cylinder 2). Therefore, at the engine angle $A_{P1}$ the control unit 11 determines an initial programming of fuel injection as a function of the desired air/fuel ratio $\lambda_{DES}$ and the first forecast $P_{PR-1}$ of the suction pressure during the suction phase.

In particular, the control unit 11 determines, at the engine angle $A_{P1}$, a first estimate of the mass $M_{AIR-1}$ of air that will be sucked into the cylinder 2 during the suction phase as a function of the first forecast $P_{PR-1}$ of the suction pressure during the suction phase. Then, the control unit 11 calculates, at the engine angle $A_{P1}$, a first mass $M_{FUEL-1}$ of fuel to be injected as a function of the first estimate of the mass $M_{AIR-1}$ of air that will be sucked into the cylinder 2 during the suction phase and of the desired air/fuel ratio $\lambda_{DES}$. Finally, the control unit 11 determines, at the engine angle $A_{P1}$, an opening engine angle $A_{O1}$ of the injector 10 and a closing engine angle $A_{C1}$ of the injector 10 as a function of the first mass $M_{FUEL}$ of fuel to be injected; the opening engine angle $A_{O1}$ of the injector 10 and the closing engine angle $A_{C1}$ of the injector 10 are the initial programming of fuel injection and indicate when the injector 10 must open and close.

At the end of the exhaust phase (i.e. at an engine angle $A_{P2}$), the control unit 11 receives from the pressure sensor 12 a measure $P_{M-S}$ of the suction pressure at the end of the exhaust phase; therefore, at the engine angle $A_{P2}$ the control unit 11 determines a second forecast $P_{PR-2}$ of the suction pressure during the suction phase by a second forecast algorithm that also uses the measure $P_{M-S}$ of the suction pressure at the end of exhaust phase. Thanks to the second forecast $P_{PR-2}$ of the suction pressure during the suction phase, the control unit 11 determines, at the engine angle $A_{P2}$, a final programming of the injection of fuel as a function of the desired air/fuel ratio $\lambda_{DES}$, of the second forecast $P_{PR-2}$ of the suction pressure during the suction phase and of the initial programming of fuel injection.

In particular, at the end of the exhaust phase, i.e. at an engine angle $A_{P2}$, the control unit 11 determines a second estimate of the mass $M_{AIR-2}$ of air that will be sucked into the cylinder 2 during the suction phase as a function of the second forecast $P_{PR-2}$ of the suction pressure during the suction phase. Therefore, the control unit 11 calculates, at the engine angle $A_{P2}$, a second mass $M_{FUEL-2}$ of fuel to be injected as a function of the second estimate of the mass $M_{AIR-2}$ of air that will be sucked into the cylinder 2 during the suction phase and of the desired air/fuel ratio $\lambda_{DES}$. Finally, at the engine angle $A_{P2}$, the control unit 11 determines: a closing engine angle $A_{C2}$ of the injector 10 as a function of the second mass $M_{FUEL-2}$ of fuel to be injected and of the opening engine angle $A_{O1}$ of the injector 10 if the fuel injector 10 has been previously opened at the opening engine angle $A_{O1}$ of the injector 10 (i.e. if the opening engine angle $A_{O1}$ of the injector 10 is in front of the engine angle $A_{P2}$), or an opening engine angle $A_{O2}$ of the injector 10 and a closing engine angle $A_{C2}$ of the injector 10 as a function of the second mass $M_{FUEL-2}$ of fuel to be injected if the fuel injector 10 is still closed (i.e. has not previously been open at the opening engine angle $A_{O1}$ of the injector 10, therefore if the opening engine angle $A_{O1}$ of the injector 10 is behind the engine angle $A_{P2}$). The opening engine angle $A_{O2}$ of the injector 10 (if present) and the closing engine angle $A_{C2}$ of the injector 10 constitute the final programming of fuel injection and indicate when the injector 10 must open and close.

In the example shown in FIG. 4, the initial programming of fuel injection has determined an opening engine angle $A_{O1}$ of the injector 10 during the exhaust phase and a closing engine angle $A_{C1}$ of the injector 10 during the intake phase; therefore at the opening engine angle $A_{O1}$ of the injector 10, the injector 10 is actually activated to start the fuel injection as expected from the initial programming of fuel injection. At the end of the exhaust phase, the final programming of fuel injection determines a different closing engine angle $A_{C2}$ of the injector 10 and then the injector 10 is closed at the closing engine angle $A_{C2}$ of the injector 10 as required by the final programming of fuel injection and ignoring the closing engine angle $A_{C1}$ of the injector 10 provided by the initial programming of fuel injection. In the event in which the initial programming of fuel injection has determined an opening engine angle $A_{O1}$ of the injector 10 during the suction phase (typically when mass $M_{FUEL}$ of fuel to be injected is reduced), then the final programming of fuel injection can also determine a new and (potentially) different opening engine angle $A_{O2}$ of the injector 10, as when determined the final programming of fuel injection the injector 10 has not yet started the injection of fuel.

According to one possible embodiment, the first forecast algorithm is identical to the second forecast algorithm and is then used to determine both the first forecast $P_{PR-1}$ of the suction pressure during the suction phase and to successively determine the second forecast $P_{PR-2}$ of the suction pressure during the suction phase. Obviously, the second forecast $P_{PR-2}$ of the suction pressure during the suction phase is always (or almost always) more accurate than the first forecast $P_{PR-1}$ of the suction pressure during the suction phase, since to determine the second forecast $P_{PR-2}$ of the suction pressure during the suction phase is also used the measurement $P_{M-S}$ of the suction pressure at the end of exhaust phase, which is close to the suction pressure during the suction phase. In this case, the only forecast algorithm of the suction pressure is known and is of the type of those implemented in the injection control unit usually commercially available.

According to a different embodiment, the first forecast algorithm is different from the second forecast algorithm. In this case, the first forecast algorithm is known, and is of the type of those implemented in the injection control unit commercially available and is used only for determining the first forecast $P_{PR-1}$ of the suction pressure during the suction phase; whereas, the second forecast algorithm is extremely simple and is used only to determine the second forecast $P_{PR-2}$ of the suction pressure during the suction phase. Preferably, the second forecast algorithm provides to make a simple linear extrapolation of a measure $P_{M-E}$ of the suction pressure at the end of the expansion phase and of a measure $P_{M-S}$ of the suction pressure at the end of exhaust phase to determine the second forecast $P_{PR-2}$ of the suction pressure during the suction phase; this linear extrapolation is clearly visible in the graph shown in the lower part of FIG. 4 and FIG. 5, where it can be clearly seen how the second forecast $P_{PR-2}$ of the suction pressure during the suction phase is part of the straight line joining the measure $P_{M-E}$ of the suction pressure at the end of the expansion phase and of a measure $P_{M-S}$ of the suction pressure at the end of exhaust phase.

In the embodiment shown in FIG. 4, the initial and final programming of fuel injection provides a single injection which must end during the suction phase (if the injection ends before the suction phase, or too close to the beginning of the suction phase there is no margin to effectively correct the injection using the final programming of fuel injection). The single injection is performed mainly between the exhaust and the suction phase; when the mass $M_{FUEL}$ of fuel to be injected is small, e.g. when the internal combustion engine 1 is at or near the minimum, the single injection could be so short so as to affect only the suction phase.

The phase of the injection (i.e., the "position" of the injection between the exhaust phase and the suction phase) should be chosen as a compromise between the minimization of emissions (a single injection itself in terms of injection time has different impact on emissions depending on the angular phase with which it is performed) and a value as central as possible between the extremes of the beginning of the suction phase (instant when it is determined the final programming of injection) and the actual closing angle of the intake valve 6 (beyond which it no longer makes sense to inject since the fuel would be sucked only in the successive mixing cycle), to ensure an equal recovery margin to the final programming of injection of both the case of lengthening the time of injection (recovery of underestimation errors in the first forecast $P_{PR-1}$ of the suction pressure during the suction phase determined by the first forecast algorithm) and in the case of shortening the time of injection (recovery of overestimation errors of the first forecast $P_{PR-1}$ of the suction pressure during the suction phase determined by the first forecast algorithm).

Where the above described constraint would be too stringent it is possible to divide the injection in two different injections: a first injection, more consistent, performed during the exhaust phase with the desired phase to obtain a certain degree of mixing (i.e. with the object of minimizing the generation of pollutants) and a second injection performed during the suction phase to ensure the respect of the desired air/fuel ratio $\lambda_{DES}$. Regarding the phase of the second injection (i.e. the "location" of the second injection within the suction phase), it is no longer necessary to choose a central value between the extremes of the beginning of the suction phase (the instant in which final programming of injection is determined) and the actual closing angle of the intake valve 6 (beyond which it no longer makes sense to inject since the fuel would be aspirated only in the successive mixing cycle), but the phase of the second injection can be chosen on the basis of optimization criteria of pollutant emissions (in addition, of course, to an appropriate anticipation with respect of the actual closing angle of the intake valve 6). In the case wherein the phase of the second injection is too great to be respected (i.e. the useful time of injection results insufficient), the preservation of the priority of the injection time with respect to the programming phase (always guaranteed in fuel injection systems) will lead to a breakthrough of the programming phase to ensure the meeting of the injection time.

In the embodiment illustrated in FIG. 5, the initial and final programming injection consists mainly of two different fuel injections: a first injection performed during the exhaust phase and a second injection performed during the suction phase (in each case, when the mass $M_{FUEL}$ of fuel to be injected is small, e.g. when the internal combustion engine 1 is at the minimum, there may be only a single injection, preferably performed during the intake phase, or between the exhaust and the suction phase).

In this case, the control unit 11 determines, at the engine angle $A_{P1}$, a first estimate of the mass $M_{AIR-1}$ of air that will be sucked into the cylinder 2 during the suction phase as a function of the first forecast $P_{PR-1}$ of the suction pressure during the suction phase. Then, the control unit 11 calculates, at the engine angle $A_{P1}$, a first mass $M_{FUEL-1}$ of fuel to be injected as a function of the first estimate of the mass $M_{AIR-1}$ of air that will be sucked into the cylinder 2 during the suction phase and of the desired air/fuel ratio $\lambda_{DES}$. The first mass $M_{FUEL}$ of fuel to be injected is divided by the control unit 11 between a first injection performed during the exhaust phase and a second injection performed during the suction phase; then, at the engine angle $A_{P1}$ the control unit 11 determines the part of a first mass $M_{FUEL-1}$ of fuel to be injected into the first injection performed during the exhaust phase and thus determines, at the engine angle $A_{P1}$, an opening engine angle $A_{O1}$ of the injector 10 located during the exhaust phase and a closing engine angle $A_{C1}$ of the injector 10 located during the exhaust phase as a function of the first mass $M_{FUEL-1}$ of fuel to be injected into the first injection performed during the exhaust phase at the engine angle $A_{P1}$ it does not make sense to also program the second injection, as in every case, the second injection will be reprogrammed at the end of the exhaust phase, i.e. at the beginning of the suction phase, as described below).

The opening engine angle $A_{O1}$ of the injector 10 and the closing engine angle $A_{C1}$ of the injector 10 constitute the initial programming of injection and indicate where to place the first injection during the exhaust phase.

At the end of the exhaust phase, i.e. at the engine angle $A_{P2}$, the engine control unit 11 determines a second estimate of the mass $M_{AIR-2}$ of air that will be sucked into the cylinder 2 during the suction phase as a function of the second forecast $P_{PR2}$ of the suction pressure during the suction phase. Therefore, the control unit 11 calculates, at the engine angle $A_{P2}$, a second mass $M_{FUEL-2}$ of fuel to be injected as a function of the second estimate of the mass $M_{AIR-2}$ of air that will be sucked into the cylinder 2 during the suction phase and of the desired air/fuel ratio $\lambda_{DES}$; knowing the mass of fuel injected by the first injection performed during the exhaust phase, the control unit 11 determines, at the engine angle $A_{P2}$, an opening engine angle $A_{O2}$ of the injector 10 located during the suction phase and a closing engine angle $A_{C2}$ of the injector 10 located during the suction phase as a function of the difference between the second mass $M_{FUEL-2}$ of fuel to be injected and the mass of fuel fed by the first injection performed during the exhaust phase (i.e. as a function of the second mass $M_{FUEL-2}$ to be injected and of the initial programming of injection). The opening engine angle $A_{O2}$ of the injector 10 and the closing engine angle $A_{C2}$ of the injector 10 constitute the final programming of the injection and indicate where to locate the second injection during the suction phase.

Assuming to perform a forecast $P_{PR1}$ of the suction pressure at the end of the expansion phase (i.e. at the start of the exhaust phase) much more rough than the actual one with errors of 15%, the second injection will have the task to recover this error: thus assuming to perform a first injection at 60% i.e. with the first injection only 60% of the first mass $M_{FUEL1}$ of fuel to be injected is injected), the second injection (theoretically at 40%) could inject an actual amount between 25% and 55% of the second mass $M_{FUEL2}$ of fuel to be injected according to the errors committed by the forecast $P_{PR1}$ of the suction pressure at the end of the exhaust phase.

It is important to note that the control unit 11 may decide from time to time and as a function of the motor point whether to use a single injection performed mainly between the exhaust and the suction phases (as shown in FIG. 4) or to perform two different injections: a first injection performed during the exhaust phase and a second injection performed during the suction phase (as shown in FIG. 5). In other words, in certain operational areas of the internal combustion engine 1 may be more convenient to have a single injection, while in other operational areas of the internal combustion engine 1 may be more convenient to have two different injections. In this regard it should be noted that is necessary to constrain the enabling of the two injections with respect to the minimum time of injection: i.e. avoid that the second injection, net of errors that must be recovered, involves an injection time less than the minimum time, i.e. a time below which the injection becomes inaccurate and implementation errors begin to be noticeable and eventually erase the gains achieved by the strategy. In other words, when the initial programming of the injection is determined, it is verified that the injection time scheduled for the second injection performed during the suction phase decreased by the absolute value of the maximum error that can be committed as a result of inaccuracies of the first forecast algorithm is higher than the minimum time of injection; only if the case is positive two distinct injections can be used, otherwise it is necessarily chosen one single injection placed between the exhaust and the suction phase.

As mentioned previously, the control strategy described above imposes a limitation in the degree of freedom represented by the choice of the injection phase, as it is mandatory that the injection is to be substantially made also during the suction phase. Such limitation in a transitional state is certainly acceptable compared to the significant increase of accuracy of the amount of fuel injected; however, in a stabilized state and for certain motor points it can be more convenient to use a traditional control strategy which provides completion of the whole injection before the start of the suction phase.

In other words, injection during suction, being able to reprogram the injection exploiting the knowledge of the second forecast $P_{PR-2}$ of the suction pressure during the suction phase provided by the second forecast algorithm, allows injection during a strong transition of acceleration of a more responsive fuel mass to the growing mass $M_{AIR}$ of air that is to be sucked, with the effect of reducing any thinness peaks due to an underestimation of the mass $M_{AIR}$ of air sucked determined by an underestimation in the determination of the forecast $P_{PR-2}$ of the suction pressure during the suction phase provided by the second forecast algorithm or any richness peaks due to an overestimation of the mass $M_{AIR}$ of air sucked, with obvious benefits in any case in the reduction of pollutant emissions and in the drivability.

The philosophy of the injection control described above substantially consists in not completely programming the injection before the exhaust phase (and preferably at the end of the expansion phase, i.e. at the start of the exhaust phase), but to determine before the exhaust phase only an initial programming of the injection; the initial programming of injection is subsequently corrected at the end of the exhaust phase by way of final programming that can be more accurate in forecasting the suction pressure during the suction phase (therefore in the determination of the mass $M_{AIR}$ of air that will be sucked into the cylinder 2 during the suction phase) as can also use the measure $P_{M-S}$ of the suction pressure at the end of the exhaust phase.

Thanks to the fact that the initial programming of injection is subsequently corrected at the end of the exhaust phase through the final programming, it is not necessary for the initial programming to be extremely precise; in other words, the error made in the initial programming is corrected (at least for the most part) of the final programming. Therefore, the first forecast algorithm providing the first forecast $P_{PR-1}$ of the suction pressure during the suction phase should not be refined and complex, as it can commit a high error rate (e.g. of the order of ±20% versus an error of the order of ±5% of the most refined and complex algorithms) without adverse effects. Similarly, also the second forecast algorithm providing the second forecast $P_{PR-2}$ of the suction pressure during the suction phase should not be refined and complex (in fact, as mentioned above it may be limited to a simple linear extrapolation), since it must forecast the evolution of suction pressure for a range of a small entity (equal to 180°, i.e. half of the crankshaft rotation) between the end of the exhaust phase and the end of the suction phase.

To summarize, the forecast algorithms of the suction pressure utilized by the injection control method described above are easy to calibrate in reason of their simplicity, requiring a modest computing power and occupying a minimum amount of memory.

Also to be pointed out is that in the case of double injection it is possible to perform the first injection with a closing engine angle $A_{C1}$ prior the exhaust phase in the case of an optimal result for the minimization of pollutants using a much more advanced forecasting pressure for the first programming and trusting, however, to make a final correction of any forecast error in the programming of the second injection.

The embodiments described above with reference to FIGS. 4 and 5 are referred to an indirect injection of fuel in which, as mentioned above, the fuel must be injected before the end of the suction phase. In the case of direct injection (as shown in FIG. 2), the fuel must be injected before the end of the compression phase, since being directly injected into the cylinder 2 it has no interaction with the opening and closing of intake valves 6. Therefore, in the case of direct injection it is possible to use a different control mode as shown in FIGS. 6 and 7.

Figure 6:
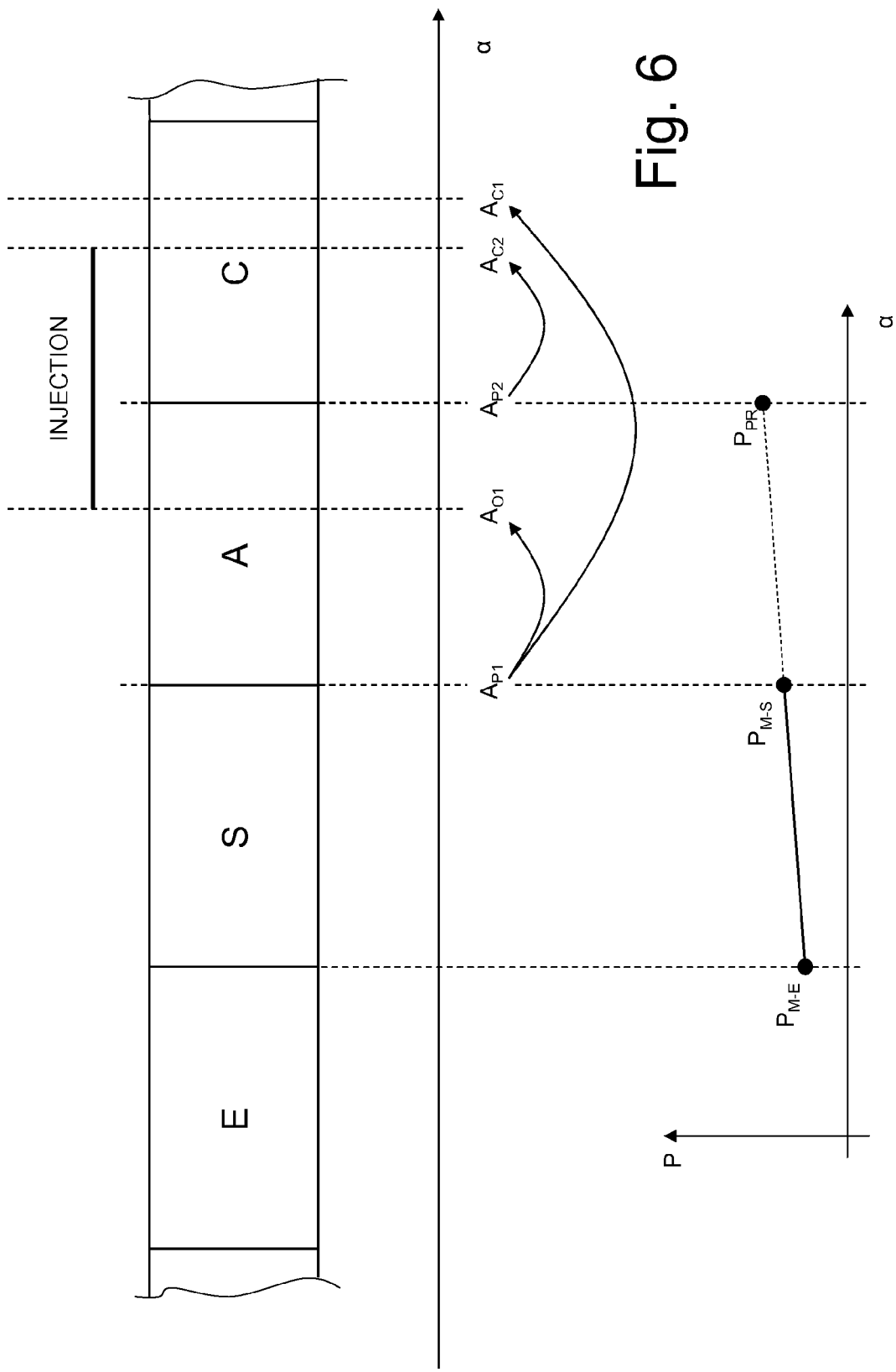

The control mode shown in FIG. 6 is completely similar to the control mode shown in FIG. 4 with the difference that a single injection is delayed by a phase (i.e. 180° corresponding to a half turn of the crankshaft); in other words, in the control mode shown in FIG. 4 (indirect injection) the single injection is between the exhaust and the suction phase while in the control mode shown in FIG. 6 (direct injection) the single injection is between the intake and compression phases. Similarly, the control mode shown in FIG. 7 is completely similar to the control mode shown in FIG. 5 with the difference that the two injections are delayed by one phase (i.e. of 180° corresponding to a half turn of the crankshaft); in other words, in the control mode shown in FIG. 5 (indirect injection) the two injections occur during the exhaust phase and during the suction phase, while in control mode shown in FIG. 7 (direct injection) the two injections occur during the intake phase and during the compression phase.

Figure 7:
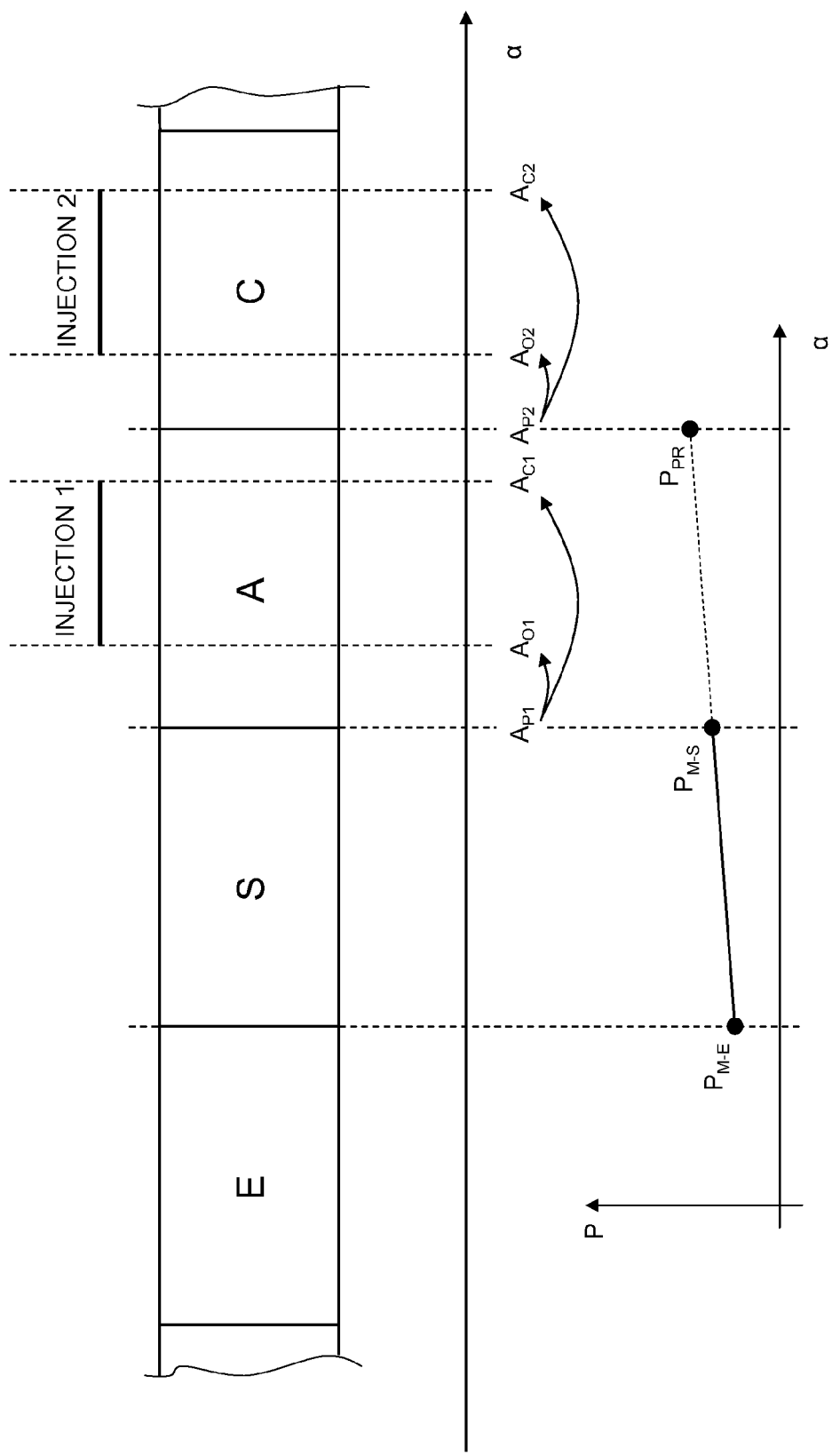

According to that shown in FIGS. 6 and 7, the control unit 11 determines a measurement $P_{M-S}$ of the suction pressure at the end of the exhaust phase, i.e. at the engine angle $A_{P1}$, and successively the control unit 11 determines, at the engine angle $A_{P1}$, a forecast $P_{PR}$ of the suction pressure during the suction phase by a forecast algorithm that uses the measure $P_{M-S}$ of the suction pressure at the end of the exhaust phase. According to a preferred embodiment already described above, this forecast algorithm uses a simple linear extrapolation of the measure $P_{M-E}$ of the suction pressure at the end of the expansion phase and of the measure $P_{M-S}$ of the suction pressure at the end of the exhaust phase. At this point, the control unit 11 determines, at the engine angle $A_{P1}$, an initial programming of fuel injection as a function of the desired air/fuel ratio $\lambda_{DES}$ and of the forecast $P_{PR}$ of the suction pressure during the suction phase.

At the end of the suction phase, i.e. at the engine angle $A_{P2}$ the control unit 11 receives from the pressure sensor 12 a measure $P_{M-A}$ of the suction pressure at the end of the suction phase, and successively the control unit 11 determines, at the engine angle $A_{P2}$, a final programming of fuel injection as a function of the desired air/fuel ratio $\lambda_{DES}$, of the measure $P_{M-A}$ of the suction pressure at the end of the suction phase and of the initial programming of fuel injection.

In the embodiment illustrated in FIG. 6, the initial and final programming of fuel injection provide a single injection which must necessarily end during the compression phase (if the injection ends before the start of the compression phase, or too close to the start of the compression phase there is no margin to effectively correct the injection using the final programming of the injection). The only injection is mainly performed between the suction and the compression phases; when the mass $M_{FUEL}$ of fuel to be injected is very small, e.g. when the internal combustion engine 1 is at minimum, the only injection could be as short as to only affect the compression phase.

In this case, the control unit 11 determines, at the engine angle $A_{P1}$, a first estimate of the mass $M_{AIR-1}$ of air that will be sucked into the cylinder 2 during the suction phase as a function of the forecast $P_{PR}$ of the suction pressure during the suction phase. Therefore, the control unit 11 calculates, at the engine angle $A_{P1}$, a first mass $M_{FUEL-1}$ of fuel to be injected as a function of the first estimate of the mass $M_{AIR-1}$ of air that will be sucked into the cylinder 2 during the suction phase and of the desired air/fuel ratio $\lambda_{DES}$. Finally, the control unit 11 determines, at the engine angle $A_{P1}$, an opening engine angle $A_{O1}$ of the injector 10 and the closing engine angle $A_{C1}$ of the injector 10 as a function of the first mass $M_{FUEL1}$ of fuel to be injected; the opening engine angle $A_{O1}$ of the injector 10 and the closing engine angle $A_{C1}$ of the injector 10 constitute the initial programming of the injection and indicate when the injector 10 has to open and close.

At the end of the suction phase, i.e. at an engine angle $A_{P2}$, the control unit 11 determines a second estimate of the mass $M_{AIR-2}$ of air that was sucked into the cylinder 2 during the suction phase as a function of the measure $P_{M-A}$ of the suction pressure during the suction phase (it is important to note that the suction pressure during the suction phase is no longer forecasted, i.e. predicted, but measured, i.e. actual). Therefore, the control unit 11 calculates, at the engine angle $A_{P2}$, a second mass $M_{FUEL-2}$ of fuel to be injected as a function of the second estimate of the mass $M_{AIR-2}$ of air that was actually sucked into the cylinder 2 during the suction phase and of the desired air/fuel ratio $\lambda_{DES}$. Finally, at the engine angle $A_{P2}$ the control unit 11 determines: a closing engine angle $A_{C2}$ of the injector 10 as a function of the second mass $M_{FUEL-2}$ of fuel to be injected and of the opening engine angle $A_{O1}$ of the injector 10 if the fuel injector 10 has been previously opened at the opening engine angle $A_{O1}$ of the injector 10 (i.e. if the opening engine angle $A_{O1}$ of the injector 10 is in front of the engine angle $A_{P2}$), or an opening engine angle $A_{O2}$ of the injector 10 and the closing engine angle $A_{C2}$ of the injector 10 as a function of the second mass $M_{FUEL-2}$ of fuel to be injected if the fuel injector 10 is still closed (i.e. it was not previously opened at the opening engine angle $A_{O1}$ of the injector 10, therefore if the opening engine angle $A_{O1}$ of the injector 10 is rear to the engine angle $A_{P2}$). The opening engine angle $A_{O2}$ of the injector 10 (if present) and the closing engine angle $A_{C2}$ of the injector 10 constitute the final programming of the injection and indicate when the injector 10 must open and close.

The phase of the single injection (i.e., the "location" of the single injection between the suction phase and the compression phase) should be chosen as a compromise between the minimization of emissions (one injection itself in terms of injection time has a different impact on emissions according to the angular phase with which it is performed) and a value as central as possible between the extremes of the starts of the compression phase (time wherein is determined the final programming of injection) and the angle of ignition of the mixture (beyond which obviously does not make sense to inject and furthermore at this point a certain timing advance must be maintained), so as to ensure an equal recovery margin to the final programming of the injection both in the case of lengthening the time of injection (recovery of underestimation errors in the first forecast $P_{PR-1}$ of the suction pressure during the suction phase determined by the forecast algorithm) and in the case of shortening the injection time (recovery of overestimation errors in the first forecast $P_{PR-1}$ of the suction pressure during the suction phase determined by the forecast algorithm).

In the embodiment shown in FIG. 7, the initial and final fuel injection programming provide mainly two different fuel injections: a first injection performed during the suction phase and a second injection performed during the compression phase (when the mass $M_{FUEL}$ of the fuel to be injected is very small, e.g. when the internal combustion engine 1 is at minimum, there may be only a single injection, preferably performed during the compression phase or between the intake and the compression phase).

In this case, the control unit 11 determines, at the engine angle $A_{P1}$, a first estimate of the mass $M_{AIR-1}$ of air that will be sucked into the cylinder 2 during the suction phase as a function of the forecast $P_{PR}$ of the suction pressure during the suction phase. Therefore, the control unit 11 calculates, at the engine angle $A_{P1}$, a first mass $M_{FUEL-1}$ of fuel to be injected as a function of the first estimate of the mass $M_{AIR-1}$ of air that will be sucked into the cylinder 2 during the suction phase and of the desired air/fuel ratio $\lambda_{DES}$. The first mass $M_{FUEL1}$ of fuel to be injected is divided by the control unit 11 between a first injection performed during the suction phase and a second injection performed during the compression phase; so, at the engine angle $A_{P1}$ the control unit 11 determines the amount of the first mass $M_{FUEL1}$ of fuel to be injected into the first injection performed during the suction phase and thus determines, at the engine angle $A_{P1}$, an opening engine angle $A_{O1}$ of the injector 10 located during the suction phase and a closing engine angle $A_{C1}$ of the injector 10 located during the suction phase as a function of the of the share of the first estimate of the mass $M_{FUEL1}$ of fuel to be injected into the first injection performed during the suction phase (at the engine angle $A_{P1}$ it does not make sense to also program the second injection, since in any case, the second injection will be reprogrammed at the end of the suction phase, i.e. at the start of the compression phase, as described below).

The opening engine angle $A_{O1}$ of the injector 10 and the closing engine angle $A_{C1}$ of the injector 10 constitute the initial programming of injection and indicate where to locate the first injection during the suction phase.

At the end of the suction phase, i.e. at the engine angle $A_{P2}$ the control unit 11 determines a second estimate the mass $M_{AIR-2}$ of air that was sucked into the cylinder 2 during the suction phase as a function of the measure $P_{M-A}$ of the suction pressure at the end of the suction phase. Therefore, the control unit 11 calculates, at the engine angle $A_{P2}$, a second mass $M_{FUEL-2}$ of fuel to be injected as a function of the second estimate of the mass $M_{AIR-2}$ of air that has been effectively sucked into the cylinder 2 during the suction phase and of the desired air/fuel ratio $\lambda_{DES}$; knowing the mass of fuel fed from the first injection performed during the suction phase, the control unit 11 determines, at the engine angle $A_{P2}$, an opening engine angle $A_{O2}$ of the injector 10 located during the compression phase and a closing engine angle $A_{C2}$ of the injector 10 located during the compression phase as a function of the difference between the second mass $M_{FUEL-2}$ of fuel to be injected and the mass of fuel fed by the first injection performed during the suction phase (i.e. as a function of the second mass $M_{FUEL-2}$ of fuel to be injected and the initial programming of injection). The opening engine angle $A_{O2}$ of the injector 10 and the closing engine angle $A_{C2}$ of the injector 10 constitute the initial programming of injection and indicate where to locate the second injection during the suction phase.

It is important to note that the control unit 11 may decide from time to time and as a function of the motor point whether to use a single injection performed mostly between the suction and the compression phases (as shown in FIG. 6) or if to perform two different injections: a first injection performed during the suction phase and a second injection performed during the compression phase (as shown in FIG. 7); in other words, in certain operational areas of the internal combustion engine 1 it may be more convenient to have only one injection, while in other operational areas of the internal combustion engine 1 it may be more convenient to have two different injections.

The philosophy of the injection control described above substantially consists in not completely programming the injection at the end of the exhaust phase (i.e. at the beginning of the suction phase), but to determine at the end of the exhaust phase only an initial programming of injection; the initial programming of injection is successively corrected at the end of the suction phase through the final programming that can be more precise in determining the mass $M_{AIR}$ of air that was sucked into the cylinder 2 during the suction phase since it knows the value measured by the pressure sensor 12 (i.e. "exact") of the suction pressure during the suction phase.

Due to the fact that the initial programming of injection is successively corrected at the end of the suction phase by the final programming, it is not necessary for the initial programming to be extremely precise; in other words, the error made in the initial programming is corrected (at least for most part) by the final programming. Thus, the forecast algorithm that provides the forecast $P_{PR}$ of the suction pressure during the suction phase should not be refined and complex, as it can commit a high error rate (e.g. of the order of ±20% versus an error of the order of ±5% of the most sophisticated and complex algorithms) without adverse effects. To summarize, the forecast algorithm of the suction pressure used by the injection control method described above is easy to calibrate in reason of its simplicity, requires modest computing power and occupies a minimum amount of memory.

The above described refers to an internal combustion engine 1 having a fixed phase of the intake valves 6, i.e. an internal combustion engine 1 in which the intake valves 6 opens and closes, always at respective same motor angles.

The above described can be applied with success also to an internal combustion engine 1 provided with a control device 13 (shown with a dashed line in FIG. 2) of the implementation (lift) of the intake valves 6, i.e. an internal combustion engine 1 wherein is possible to modify at each engine cycle the opening angles, the closing angles, and the lift profiles of the intake valves 6.

In particular, when the control device 13 for the implementation of the intake valves 6 consists of actuators that control the intake valves 6 managing opening angle, closing angle and lift it is possible to control the delivered torque through the intake valve 6 themselves (i.e. without using the throttle valve 7). In this case, the throttle valve 7 is normally maintained in the fully open position to maintain the intake manifold 5 at the maximum pressure represented by the atmospheric pressure in a naturally aspirated engine or supercharger pressure in a supercharged engine. The programming of the implementation control of each intake valve 6 requires knowledge of the suction pressure, i.e. the air pressure present inside the intake manifold 5, which will be present at the time of the opening of the intake valve 6 (equal to the opening of the intake valve 6 is in fact trapped in the corresponding cylinders 2 more or less air as a function of the suction pressure) and the suction pressure cannot be considered constant as it may vary for at least three reasons. In particular, the suction pressure varies when the throttle valve 7 is opened or closed during the switching between a control mode of the traditional torque by controlling the throttle valve 7 and a control mode of an innovative torque by using the control of the intake valves 6 or in the case of actuator limitations (for example in the case of very small objective air mass involving a valve implementation less than the minimum allowed that can be remedied by reducing the suction pressure). Moreover, in a turbocharged supercharged engine the suction pressure varies greatly depending on the engagement or the disengagement of the turbocharger.

It is evident that even in an internal combustion engine 1 provided with a control device 13 for the implementation of the intake valve 6 it is necessary to know in advance the suction pressure during each suction phase to be able to correctly program the implementation of the intake valves 6, i.e. establishing for each intake valve 6 the opening engine angle $B_O$ of the intake valve 6 (i.e. start of the sucking of air), the closing engine angle $B_C$ of the intake valve 6 (i.e. end of the sucking of air) and generally the lift profile that for the simplicity of description in the following will be considered fixed once the opening engine angle $B_O$ and the closing engine angle $B_C$ of the intake valve 6 is chosen. Since according to the type of actuator (electronic, electro-hydraulic . . . ) the programming of the control of the intake valves 6 can be done with an higher timing advance than the two motor phases (an electro-hydraulic actuator, for example, depending on the motor point and operating conditions, requires programming also in very anticipated phases as the start of the previous expansion or even compression phases), the forecast of the suction pressure is made even more difficult and allows for further complications.

A current traditional system provides a single programming of the control of the intake valves 6 and fuel injection. A forecast error made at the programming of the control of the intake valves 6 and of fuel injection is therefore translated both into an error of generation of the torque since a mass $M_{AIR}$ of air different from that expected will be injected and in an increase in emissions will be trapped since a mass $M_{FUEL}$ of fuel for a mass $M_{AIR}$ of air different from that actually sucked.

Making, however, at the start of the suction phase an estimate of the mass $M_{AIR}$ of air about to be sucked by the programming of the control of the intake valves 6 already launched and based on a forecasting of the suction pressure that uses the measurement of the suction pressure performed at the end of the exhaust phase as described above, it is possible to recalculate a mass $M_{FUEL}$ of fuel adapted to said mass $M_{AIR}$ of air about to be actually sucked and make a correction of the initial programming of the injector 10 according to that described above (i.e. an initial programming and a final programming which corrects the initial programming) in order to respect the desired air/fuel ratio $\lambda_{DES}$ and therefore to ensure the minimization of the generation of pollutants during combustion. Since, however, due to the error of forecast at programming of the control of the intake valves 6, a mass $M_{AIR}$ of air different from the desired one has been sucked, it is not possible to recover during the transition the error on the torque (i.e. the torque actually generated is different from the desired torque).

By alternatively providing a dual programming of the control of the intake valves 6 (i.e. an initial programming and a final programming that corrects the initial programming) it is possible to also correct the error on the mass $M_{AIR}$ of air sucked thus ensuring also the respect of the desired torque. In particular, as shown in FIG. 8 dual programming of the control of each intake valve 6 provides the performing of an initial programming of the control of the intake valves 6 at an engine angle $B_{P1}$ arranged depending on the type of actuator from the start of the exhaust phase at the start of the compression phase and then according to the programming of the control of the intake valves 6 at an engine angle $B_{P2}$ arranged prior the suction phase (and preferably at the end of the exhaust phase).

Figure 8:
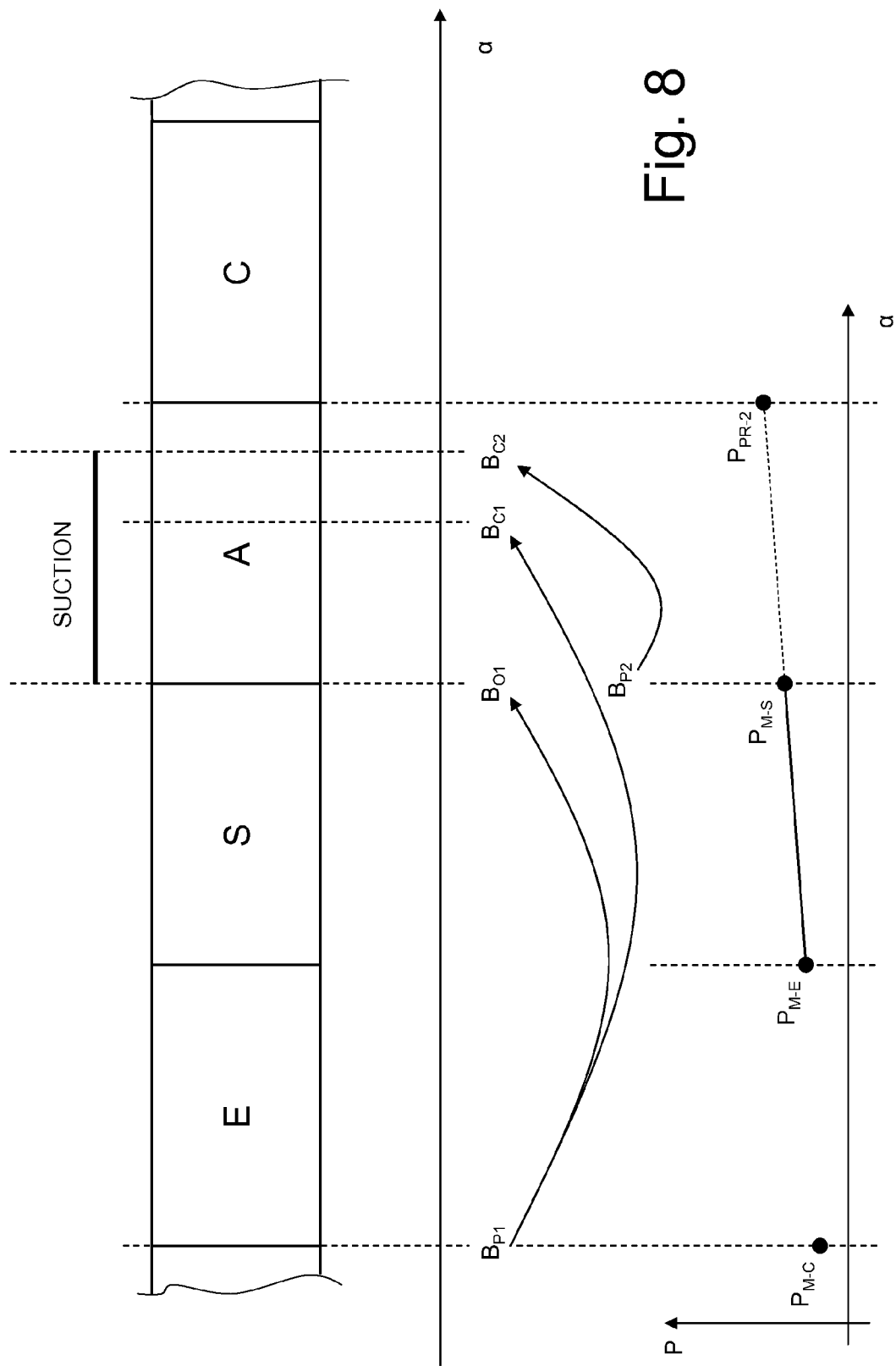
FIG. 8 is a graph illustrating the programming and execution of the sucking of air in the presence of a control device for the implementation of the intake valves during the four phases of a cylinder of the internal combustion engine of FIG. 1 according to the control of suction of air object of the present invention.

With reference to FIG. 8 and described as follows is a procedure used by the control unit 11 for controlling the suction of air in a single cylinder 2.

Initially, the control unit 11 determines a desired mass $M_{AIR\text{-}DES\text{-}1}$ of air to be sucked into the cylinder 2 during the suction phase according to the torque, to be generated as necessary during combustion.

At the arranged engine angle $B_{P1}$, for example, at the start of the expansion phase the control unit 11 determines a first forecast $P_{PR\text{-}1}$ of the suction pressure during the suction phase by way of the first forecast algorithm that uses the above measurements $P_M$ of the suction pressure (which are provided by the pressure sensor 12 to the control units 11 at the end of each phase of the cycle of the cylinder 2). Then, at the engine angle $B_{P1}$ the control unit 11 determines an initial programming of the suction of air as a function of the desired mass $M_{AIR\text{-}DES\text{-}1}$ of air to be sucked into the cylinder 2 during the suction phase and of the first forecast $P_{PR\text{-}1}$ of the suction pressure during the suction phase.

In particular, the control unit 11 determines, at the engine angle $B_{P1}$, an opening engine angle $B_{O1}$ of the intake valve 6 and a closing engine angle $B_{C1}$ of the intake valve 6 which constitute the initial programming of the sucking of air and indicates when the intake valve 6 must open and close.

At the end of the exhaust phase (i.e. at an engine angle $B_{P2}$), the control unit 11 receives from the pressure sensor 12 a measurement $P_{M\text{-}S}$ of the suction pressure at the end of the exhaust phase; so at an engine angle $B_{P2}$ the control unit 11 determines a second forecast $P_{PR\text{-}2}$ of suction pressure during the suction phase by way of the second forecast algorithm that also uses the measure $P_{M\text{-}S}$ of the suction pressure at the end of the exhaust phase. Thanks to the second forecast $P_{PR\text{-}2}$ of the suction pressure during the suction phase, the control unit 11 determines, at an engine angle $A_{P2}$, a final programming of the suction of air as a function of the second forecast $P_{PR\text{-}2}$ of the suction pressure during the suction phase and of the initial programming of the suction of air (i.e. taking into account if for the effect of the initial programming of the suction of air the intake valve 6, at the final programming, has already been opened or is about to open at the opening engine angle $B_{O1}$ of the intake valve 6).

In particular, at the end of the exhaust phase, i.e. at the engine angle $B_{P2}$, the control unit 11 determines an opening engine angle $B_{O2}$ of the intake valve 6 and a closing engine angle $B_{C2}$ of the intake valve 6 which constitute the final programming of the suction of air and indicate when the intake valve 6 must open and close.

Depending upon the speed of the actuator, the opening engine angles $B_{O1}$ and $B_{O2}$ of the intake valve 6 can be identical to each other and coinciding with the start of the suction phase as the engine angle $B_{P2}$ to which is determined the final programming of the suction of air is probably too close to the opening engine angle $B_{O1}$ of the intake valve 6 determined by the initial programming of the suction of air to be able to open the intake valve 6 to a different opening engine angle $B_{O1}$ of the intake valve 6. In other words, in general the correction of the suction of air performed by the final programming of the suction of air can provide for the adjustment (early or late) of opening and/or closing angles of the intake valve 6 and also the variation of the openings provided for the intake valve 6 (single opening or multiple openings) and generally of the raising profile. However, without loss of generality, the following will focus on the case of a correction of the suction of air performed by the final programming of the suction of air, by adjusting (early or late) only the closing engine angle $B_C$ of the intake valve 6.

In the example shown in FIG. 8, the initial programming of the suction of air has determined an opening engine angle $B_{O1}$ of the intake valve 6 at the beginning of the suction phase and a closing engine angle $B_{C1}$ of the intake valve 6 during the suction phase. At the end of the exhaust phase, the final programming of the suction of air determines a different closing engine angle $B_{C2}$ of the intake valve 6 and therefore the intake valve 6 is closed at the closing engine angle $B_{C2}$ of the intake valve 6 as required by the final programming of the suction of air and ignoring the closing engine angle $B_{C1}$ of the intake valve 6 provided by the initial programming of the suction of air.

In other words, with an advance with respect to the start of the suction phase (which, depending on the type of actuator and operating conditions can vary since the start of the exhaust phase to the start of the compression phase) is determined an initial programming of the suction of air as a function of the desired mass $M_{AIR\text{-}DES\text{-}1}$ of air to be sucked into the cylinder 2 during the suction phase and of the first forecast $P_{PR\text{-}1}$ of the suction pressure during the suction phase; so suction of air into the cylinder 2 is controlled, until the end of the exhaust phase, by driving the control device 13 of implementation of the intake valve 6 according to the initial programming of the suction of air. At the end of the exhaust phase a final programming of the suction of air is determined as a function of the second forecast $P_{PR\text{-}2}$ of the suction pressure during the suction phase; so the suction of air into the cylinder 2 is controlled, starting from the suction phase, by piloting the control device 13 for the implementation of the intake valve 6 according to the final programming of the suction of air (e.g. by altering a command in progress).

According to a possible embodiment, also the final programming of the suction of air is determined as a function of the desired mass $M_{AIR\text{-}DES\text{-}1}$ of air to be sucked into the cylinder 2 during the suction phase already been used previously for the initial programming of the suction of air.

According to an alternative embodiment, at the end of the exhaust phase is determined a new and updated desired mass $M_{AIR\text{-}DES\text{-}2}$ of air to be sucked into the cylinder 2 during the suction phase as a function of the torque that must be generated during the known combustion at the end of the exhaust phase; consequently, the final programming of the intake of air is determined as a function of the desired mass $M_{AIR\text{-}DES\text{-}2}$ of air to be sucked into the cylinder 2 during the suction phase. In this way, it is possible to follow, with minimal delay, the evolution of the torque (i.e. of the torque, which is to be produced during the combustion) making the response of the internal combustion engine 1 very fast. Determining the final programming of the suction of air, i.e. by making a correction of the programming of suction of air at the end of the exhaust phase, any eventual change of the objective of torque is already achieved after only two motor phases with an advance of response even of three motor phases compared to a standard control of the programming of the suction of air of the case, for example, of a slow actuator that requires programming at the start of the compression phase (the delay of two engine phases represents the physical limit of the system, i.e. the minimum latency time achievable by an internal combustion engine).

Clearly, the updating of the programming of the suction of air to a more updated target of torque impose the execution of a similar upgrade of the programming of fuel injection to ensure the respect of the desired air/fuel ratio $\lambda_{DES}$; the update of the final programming takes place according to the steps described above. In addition, in the updating of the programming of the suction of air it is necessary to also take into account the real possibilities of correcting the fuel injection (i.e. the final programming of fuel injection has precise limits of intervention that cannot be passed) and therefore changing the programming of the suction of air must be such as to not exceed the actual possibility of correcting the fuel injection to ensure the respect of the desired air/fuel ratio $\lambda_{DES}$. If the injection is divided into two different injections, the splitting of the mass $M_{FUEL}$ of fuel between the two injections must be reasonable to allow to the second injection to have the appropriate degree of correction: if the first injection is too large the second injection is then difficult to pursue substantial reductions of torque (since most of the fuel has been injected with the first injection) or provide a small increase in torque (for the limit constituted by the minimum injector time); however, if the first injection is too small, especially at high speed, the second injection is then difficult to inject a consistent mass $M_{FUEL}$ of fuel to obtain what is still missing to be injected (since to the closing angle of the intake valve 6 it is necessary to have completed the fuel injection and at high speed this translates into an injection that opens at the beginning of suction to close after a very short time). Similarly also in the case of injection performed in a single solution the choice of the phase must be such as to guarantee the desired elasticity.

In any case it must be allowed the possibility to correct the final programming of the suction of air in case of limitation of the injection (inability to deliver exactly the desired target at the instant of the second programming of injection) in order to trap a mass $M_{AIR}$ of air compatible with the fuel injection limit (maximum or minimum) and the desired air/fuel ratio $\lambda_{DES}$.

Regarding the programming of injection it should be noted that the closing engine angle $A_C$ of the injector 10 should be chosen considering the need to keep a small safety margin from the closing engine angle $B_{C1}$ of the intake valve 6 variable in this case.

The philosophy of the control of suction of air described above is essentially in non programming the suction of air entirely at an anticipated phase with respect to the beginning of the suction phase, but to perform initially only the initial programming of the suction of air; the initial programming of the suction of air is successively corrected at the end of the exhaust phase by way of final programming for both benefit from the increased accuracy in forecasting the suction pressure during the suction phase (as the measurement $P_{M-S}$ of suction pressure can also be used at the end of the exhaust phase), and to acknowledge the ultimate goal of the desired torque (and therefore of the mass of air to be sucked) corresponding to the request of the driver at the final programming (at the same time also operating a correction of the programming of fuel in the terms specified above).

Due to the fact that the initial programming of the suction of air is subsequently corrected at the end of the exhaust phase by the final programming, it is not necessary for the initial programming to be extremely precise; in other words, the error committed in the initial programming is corrected (at least for the most part) by the final programming. So, the first forecast algorithm that provides the first forecast $P_{PR-1}$ of the suction pressure during the suction phase should not be refined and complex, as it can commit a high error rate (e.g. of the order of ±20% vs. an error of the order of ±5% of the most refined and complex algorithms) without adverse effects. Similarly, the second forecast algorithm that provides the second forecast $P_{PR-2}$ of the suction pressure during the suction phase should not be refined and complex (in fact, as mentioned above may be limited to a simple linear extrapolation), since it must forecast the evolution of the suction pressure for a range of a small entity (up to 180°, i.e. half of the crankshaft rotation) between the end of the exhaust phase and the end of the suction phase.

The invention claimed is:

1. Method of controlling the aspiration of air into a four-stroke internal combustion engine (1) with controlled ignition comprising at least one cylinder (2), an intake collector (5) that feeds fresh air into the cylinder (2) through at least one intake valve (6), an injector (10) that injects fuel into the cylinder (2), and a control device (13) for the implementation of the intake valve (6); the control method comprises the steps of:

determining, in a phase prior to the suction phase, a first estimate of the mass ($M_{AIR-DES-1}$) of the desired air to be sucked into the cylinder (2) during suction phase;

determining, in a phase prior to the suction phase, a first forecast ($P_{PR-1}$) of the suction pressure during the suction phase by a first forecast algorithm that uses previous measures ($P_M$) of the suction pressure;

determining, in a phase prior to the suction phase, an initial programming of the suction of air as a function of the first estimate of the mass ($M_{AIR-DES-1}$) of the desired air to be sucked into the cylinder (2) during the suction phase and of the first forecast ($P_{PR-1}$) of the suction pressure during the suction phase;

controlling, until the end of the exhaust phase, the aspiration of air into the cylinder (2) by piloting the control device (13) for the implementation of the intake valve (6) according to the initial programming of the suction of air; and determining a measure ($P_{M-S}$) of the suction pressure at the end of exhaust phase;

the control method is characterized in that it comprises the additional steps of:

determining, at the end of the exhaust phase, a second forecast ($P_{PR-2}$) of the suction pressure during the suction phase by a second forecast algorithm that also uses the measure ($P_{M-S}$) of the suction pressure at the end of exhaust phase;

determining, the end of the exhaust phase, a final programming of air suction as a function of the second forecast ($P_{PR-2}$) of the suction pressure during the suction phase and of the initial programming of air suction; and controlling, starting from the suction phase, the suction of air into the cylinder (2) by piloting the control device (13) for the implementation of the intake valve (6) according to the final programming of air suction.

2. Control method according to claim 1, wherein the first forecast algorithm is identical to the second forecast algorithm.

3. Control method according to claim 1, wherein the first forecast algorithm is different from the second forecast algorithm.

4. Control method according to claim 3, wherein the second forecast algorithm makes a linear extrapolation of a measure ($P_{PR-2}$) of the suction pressure at the end of the expansion phase and a measure ($P_{M-S}$) of the suction pressure at the end of exhaust phase to determine the second forecast ($P_{PR-2}$) of the suction pressure during the suction phase.

5. Control method according to claim 1, comprising the additional step of determining, at the end of exhaust phase, the final programming of the air suction as a function of the second forecast ($P_{PR-2}$) of the pressure suction during the suction phase, as a function of the first estimate of the mass ($M_{AIR-DES-1}$) of the desired air to be sucked into the cylinder (2) during the suction phase, and as a function of the initial programming of the air suction.

6. Control method according to claim 1 comprising the additional steps of:

determining at the end of exhaust phase, a second estimate of the mass ($M_{AIR-DES-2}$) of desired air to be sucked into the cylinder (2) during the suction phase; and determining, at the end of exhaust phase, the final programming of air suction as a function of the second forecast ($P_{PR-2}$) of the suction pressure during the suction phase, as a function of the second estimate of the mass ($M_{AIR-DES-2}$) of desired air to be sucked into the cylinder (2) during the suction phase and as a function of the initial programming of air suction.

* * * * *

UNITED STATES PATENT AND TRADEMARK OFFICE
CERTIFICATE OF CORRECTION

PATENT NO. : 8,521,402 B2  
APPLICATION NO. : 13/182593  
DATED : August 27, 2013  
INVENTOR(S) : Renzo Ruggiano Page 1 of 1

It is certified that error appears in the above-identified patent and that said Letters Patent is hereby corrected as shown below:

On the Title Page, Item (30), under "Foreign Applications Priority Data" delete "B02010A0447" and insert therefor --BO2010A0447--.

Signed and Sealed this  
Twenty-eighth Day of January, 2014

Michelle K. Lee  
*Deputy Director of the United States Patent and Trademark Office*